United States Patent [19]

Herman

[11] Patent Number: 4,858,429
[45] Date of Patent: Aug. 22, 1989

[54] CABLE STARTER FOR AIR LAUNCH MISSILE

[75] Inventor: Gerald J. Herman, Farmington Hills, Mich.

[73] Assignee: Williams International Corporation, Walled Lake, Mich.

[21] Appl. No.: 186,801

[22] Filed: Apr. 27, 1988

[51] Int. Cl.$^4$ ............................................ F02C 7/275
[52] U.S. Cl. ...................... 60/39.141; 60/39.142; 244/53 A; 244/63
[58] Field of Search .................. 60/39.141, 39.142; 244/53 A, 63; 123/179 SE, 179 AS, 185 A, 185 D; 446/232, 235, 248, 261

[56] References Cited

U.S. PATENT DOCUMENTS

| | | | |
|---|---|---|---|
| 1,258,450 | 3/1918 | Pepperd | 244/53 A |
| 1,816,976 | 8/1931 | Kirkham | 244/53 A |
| 2,528,711 | 11/1950 | Roche | 244/53 A |
| 2,651,910 | 9/1953 | Zakarian | 60/39.142 |
| 2,652,045 | 9/1953 | Cole | 123/185 A |
| 2,991,584 | 7/1961 | Kaufman | 446/235 |
| 4,331,110 | 5/1982 | Robinet | 123/185 A |

Primary Examiner—Donald E. Stout
Attorney, Agent, or Firm—Lyman R. Lyon

[57] ABSTRACT

A gas turbine engine has a cable drum drivably connected to the compressor and turbine of the engine. A cable is wound about said drum and is tensioned by relative movement between the engine and a support vehicle to effect rotation of the engine compressor and turbine independently of air flow through said engine.

1 Claim, 1 Drawing Sheet

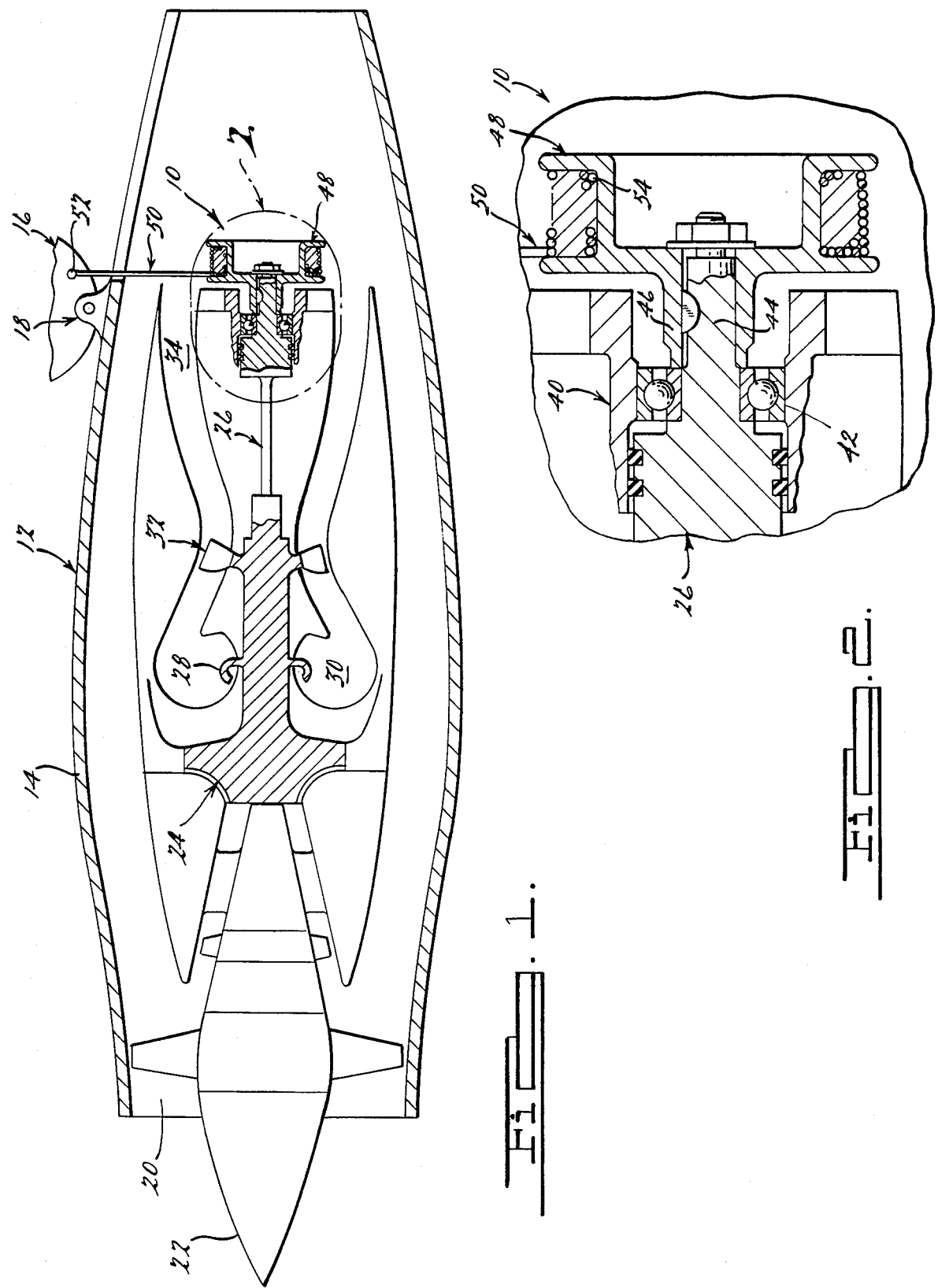

CABLE STARTER FOR AIR LAUNCH MISSILE

BACKGROUND OF THE INVENTION

It is known to launch a gas turbine powered missile either from a fixed launching platform by using a booster rocket, or from an aircraft by launching the missile by releasing it into the air stream. However, in either case there is the possibility of start failure due to attenuation of combustion air flow necessary to effect start of the turbine engine.

SUMMARY OF THE INVENTION

The aforesaid problem is solved by utilizing movement of the missile relative to its launch platform to supply the energy necessary to mechanically accelerate the gas turbine engine to its starting rotational speed.

Specifically, a drum is attached to a common compressor and turbine shaft of the engine for the acceptance of a start cable. The cable is attached to the launch platform. As the missile accelerates or decelerates relative to the launch platform both the compressor and the turbine of the engine is spun up. When a free end of the cable is reached the engine is free to continue accelerating both in rotation and in translation relative to the platform. The cable remains connected to the launch platform. Stated in another manner, mechanical energy utilized for engine start is derived from relative movement between the missile and its launch platform.

BRIEF DESCRIPTION OF THE DRAWINGS

FIG. 1 is a cross sectional view of a gas turbine engine provided with the cable starter of the instant invention.

FIG. 2 is a view taken within the circle 2 of FIG. 1.

DETAILED DESCRIPTION OF THE PREFERRED EMBODIMENT OF THE INVENTION

As seen in FIG. 1 of the drawings a cable starter 10, in accordance with a preferred embodiment of the instant invention, is shown in the environment of a conventional gas turbine engine 12 of a missile (not shown). The engine 12 comprises an outer housing 14 which is secured to a launch platform 16 as by a conventional mounting rack 18. The turbine engine 12 comprises an air inlet 20 with a centrally disposed nose cone 22. A radial outflow compressor 24 is mounted for rotation by a central shaft 26. A fuel slinger 28 is secured to the shaft 26 for rotation therewith and distribution of fuel into a combuster 30. Combustion gas flows from the combuster 30 through a turbine 32 to an exhaust duct 34. The aforesaid components and orientation thereof are conventional in nature and form no part of the present invention.

In accordance with the present invention, the compressor 24, fuel slinger 28, and turbine 32 of the gas turbine 12 are mechanically spun up to start RPM by the cable starter mechanism 10. The starter mechanism 10 affects direct mechanical rotation of the engine shaft 26 thereby transmitting start rotation to the compressor 24, fuel slinger 28 and turbine 32.

As best seen in FIG. 2 of the drawing, a cylindrical housing or sleeve 40 supports a bearing 42 which in turn supports an end portion 44 of the engine shaft 26. The engine shaft 26 is keyed to a cylindrical sleeve portion 46 of a cable drum 48. A cable 50 is wound about the drum 48, one end 52 thereof being secured to the launch platform 16, an opposite end 54 thereof being free on the drum 48.

Upon launch of a missile utilizing the gas turbine 12 for propulsion from the launch platform 16, relative movement between the engine 12 and the launch platform 16 affects tensioning of the start cable 50, rotation of the drum 48 and engine shaft 26, and acceleration of the gas turbine 12 to starting RPM. Thus, start up is augmented and guaranteed by a mechanical system that is redundant to the conventional fluid flow start up system.

While the preferred embodiment of the invention has been disclosed, it should be appreciated that the invention is susceptible of modification without departing from the scope of the following claims.

I claim:

1. In a gas turbine engine adapted to be launched from a platform, said engine comprising a compressor and turbine mechanically connected to one another by a shaft, an improved cable start system for said engine comprising, a cable drum drivably connected to said engine shaft, and a cable wound about said drum in a plurality of coils, said cable having one end fixed to said launch platform and an opposite end freely disposed about said drum and underlying said coils whereby relative movement between said engine and said launch platform effects tensioning of said cable and rotation of said drum and engine shaft independently of air flow through said engine.

* * * * *